United States Patent [19]

Benvenuto

[11] Patent Number: 4,815,136
[45] Date of Patent: Mar. 21, 1989

[54] VOICEBAND SIGNAL CLASSIFICATION

[75] Inventor: Nevio Benvenuto, Neptune, N.J.

[73] Assignees: American Telephone and Telegraph Company, New York, N.Y.; AT&T Bell Laboratories, Murray Hill, N.J.

[21] Appl. No.: 927,506

[22] Filed: Nov. 6, 1986

[51] Int. Cl.$^4$ ............................................. G10L 5/06
[52] U.S. Cl. ...................................... 381/43; 381/46; 364/513.5; 379/351; 341/143
[58] Field of Search .................................. 381/29–51; 364/513, 513.5; 370/81; 379/142, 164, 351, 416; 341/143

[56] References Cited

U.S. PATENT DOCUMENTS 4,281,218 7/1981 Chuang et al. .
4,297,533 10/1981 Gander et al. .................... 381/46 X

OTHER PUBLICATIONS

"Visual Pattern Recognition by Moment Invariants", M. K. Hu, IRE Transactions on Information Theory, Feb. 1962, pp. 179–187.
IEEE Transactions on Communications, vol. COM-30, No. 4, Apr. 1982—*Highly Sensitive Speech Detector and High-Speed Voiceband Data Discriminator in DSI-ADPCM Systems* by Yohtaro Yatsuzuka.
IBM Technical Disclosure Bulletin vol. 26 No. 1, Jun. 1983—*Voice/Data Detector and Discriminator for Use in Transform Speech Coders* by D. R. Irvin.

Primary Examiner—Patrick R. Salce
Assistant Examiner—Emanuel Todd Voeltz
Attorney, Agent, or Firm—Thomas Stafford

[57] ABSTRACT

A signal is classified as one among a plurality of classifications by employing the autocorrelation of a complex low-pass version of the signal, i.e., the complex autocorrelation. The normalized magnitude of the complex autocorrelation obtained at a prescribed delay interval, i.e., "lag", is compared to predetermined threshold values to classify the signal as having one of a plurality of baud rates.

18 Claims, 3 Drawing Sheets

VOICEBAND SIGNAL CLASSIFICATION

TECHNICAL FIELD

This invention relates to signal classifiers and, more particularly, to an arrangement for classifying an incoming signal among one of a plurality of classifications.

BACKGROUND OF THE INVENTION

In recent times bit rate reduction techniques have been employed to increase transmission capacity over digital transmission facilities. One such technique is adaptive differential pulse code modulation (ADPCM). ADPCM is employed to increase capacity over voiceband digital transmission facilities. Use of 32 kilobit/sec ADPCM is increasing and, normally, doubles the capacity of T carrier facilities. Greater transmission capacity may be realized by judiciously transmitting the voiceband signals at still lower bit rates than the 32 kilobit/sec rate.

The 32 kilobit/sec rate ADPCM, however, presents a problem when transmitting certain non-voice signals. Typically, non-voice signals, for example, voiceband data signals, are transmitted at the 32 kilobit/sec rate ADPCM. That is, no bits are allowed to be dropped to lower the transmission bit rate. When transmitting "higher" bit rate voiceband data signals, for example, those generated by a 9600 bit/sec or higher rate modem, the use of the 32 kilobit/sec so-called fixed rate ADPCM results in unacceptable bit error rates. Consequently, the data must be retransmitted thereby resulting in unacceptable transmission throughput. In order to minimize this problem it is desirable to transmit the 9600 bit/sec and higher rate voiceband data signals at an ADPCM transmission bit rate or other PCM transmission bit rates higher than the present fixed ADPCM bit rate of 32 kilobit/sec. Additionally, it may be acceptable and desirable to transmit voiceband data signals having "lower" bit rates at a bit rate less than the 32 kilobit ADPCM. In order to effect transmission of the voiceband data signals as bit rates higher or lower than the 32 kilobit/sec ADPCM rate, they must be classified as to their respective baud rates.

Heretofore, attempts at classifying voiceband data signals have used a so-called ordinary autocorrelation of the signal. A problem with the use of the ordinary autocorrelation is that the results are modulated by the carrier frequency of the data signal. Consequently, the results of such a classifying arrangement do not accurately reflect the baud rates of the voiceband data signals.

SUMMARY OF THE INVENTION

Classification of an incoming signal is realized, in accordance with an aspect of the invention, by employing a classification arrangement which is based on the autocorrelation of a complex low-pass version of an incoming signal, i.e., the complex autocorrelation.

In acccordance with a particular aspect of the invention the magnitude of the autocorrelation of the complex low-pass version of the incoming signal is uniquely employed to classify incoming voiceband data signals.

More specifically, the normalized magnitude of the complex autocorrelation function determined for a specific delay interval, i.e., lag, is related to the spectral width of the incoming signal independent of carrier frequency and, in turn, the spectral width is related to the baud rate for the voiceband data signals. The normalized magnitude is compared to predetermined threshold values to classify the incoming signal as one of a plurality of classifications, for example, one of a plurality of baud rates.

BRIEF DESCRIPTION OF THE DRAWING

The invention will be more fully appreciated from the following detailed description when considered in conjunction with the accompanying figures, in which.

DETAILED DESCRIPTION

Figure 1:
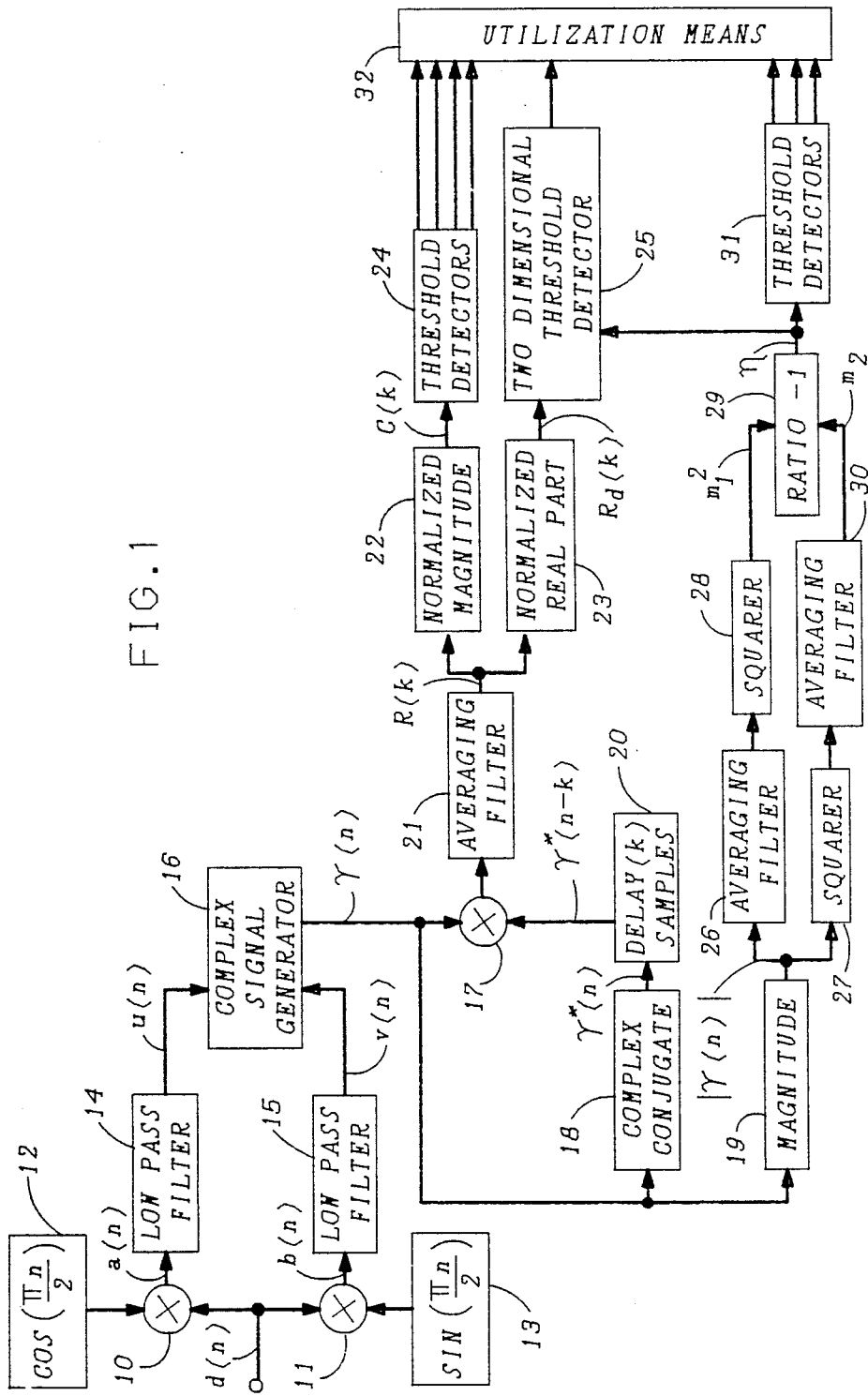
FIG. 1 shows in simplified block diagram form a signal classification arrangement including an embodiment of the invention.

FIG. 1 shows in simplified block diagram form an arrangement for classifying voice band signals in accordance with aspects of the invention. Accordingly, shown is incoming digital signal d(n), being supplied to multipliers 10 and 11. In this example, signal d(n) is in linear PCM form with a sampling rate of 8 kHz. Thus, a sample interval is 125μ seconds. A signal representative of cos ($\pi n/2$) is supplied from cos ($\pi n/2$) generator 12 to multiplier 10. In turn, multiplier 10 yields $a(n)=d(n)\cos(\pi n/2)$. Similarly, a signal representative of sin ($\pi n/2$) is supplied from sin ($\pi n/2$) generator 13 to multiplier 11. In turn, multiplier 11 yields $b(n)=d(n)\sin(\pi n/2)$. Signal a(n) is supplied to low pass filter 14 which yields a low pass version thereof, namely, u(n). Similarly, signal b(n) is supplied to low pass filter 15 which also yields a low pass version thereof, namely, v(n). In this example, low pass filters 14 and 15 are each a second order recursive filter with a cutoff frequency at 2 kHZ. Both u(n) and v(n) are supplied to complex signal generator 16 which yields $\gamma(n)=u(n)-jv(n)$. $\gamma(n)$ is a complex low pass version of d(n). It is noted that the complex low-pass version, $\gamma(n)$, may be generated by other arrangements; one example being a Hilbert filter. Signal $\gamma(n)$ is supplied to multiplier 17, complex conjugate generator 18 and magnitude generator 19. The complex conjugate $\gamma^*(n)$ of the complex low pass version signal $\gamma(n)$ is supplied from complex conjugate generator 18 to delay unit 20. In turn, delay unit 20 delays each sample representation of $\gamma^*(n)$ a predetermined number, k, of sample intervals. In this example, a delay k, i.e., lag, of two (2) sample intervals is advantageously used. The delayed complex conjugate $\gamma^*(n-k)$ is supplied to multiplier 17 where it is combined via multiplication with $\gamma(n)$ to yield $\gamma(n)\gamma^*(n-k)$. In turn, the combined signal $\gamma(n)\gamma^*(n-k)$ is supplied to averaging filter 21 which yields the complex autocorrelation of $\gamma(n)$, namely, $$R(k) = \frac{1}{N} \sum_{n=1}^{N} \gamma(n)\gamma^*(n-k)$$

where N is a number of samples, i.e., window size, used to generate a so-called estimate of R(k). In one example, N=1024 for classifying voice band data signals and N=256 for classifying between speech and voice band data. Averaging filter 21 generates the complex autocorrelation $R(k)=R(k)+\gamma(n)\gamma^*(n-k)/N$, i.e., the present estimate, R(k) is the previous estimate of R(k) plus an averaged update portion $\gamma(n)\gamma^*(n-k)/N$. It is important to note that the magnitude of the complex autocorrelation $R(k)$ of digital signal $\gamma(n)$ is independent of the carrier frequency of the voice band data signal $d(n)$. Consequently, the results of the classifying arrangement of the invention are not modulated by the voice band data signal carrier frequency and, accurately, reflex the baud rates of the voiceband data signals. The complex autocorrelation $R(k)$ is supplied to normalized magnitude unit 22 and normalized real part unit 23.

Normalized magnitude unit 22 generates $$C(k) = \frac{|R(k)|}{R(0)} \cdot |R(k)| \text{ is}$$

normalized by $R(O)$, because the signal level of $d(n)$ may vary. $R(O)$ is representative of the power of incoming signal $d(n)$. In this example, the value of $C(k)$ employed is, as indicated above, at delay $k=2$ and the normalization factor is $R(k)$ at delay $k=0$. The output $C(k)$, or in this example $C(2)$, from normalized magnitude unit 22 is supplied to threshold detectors unit 24. Threshold detectors unit 24 includes a plurality of threshold detectors (not shown) which discriminate between the baud rates of the voice band data signals. The particular threshold levels are obtined by minimizing the probability of false detection under the assumption that $C(k)$, at a given delay k, i.e., lag, if Gaussian distributed over many experimental results. The delay value $k=2$ was selected in this example because it yields the best overall results. However, for lower transmission rates, e.g., 1200 and 300 FSK, a delay of $k=3$ seems to produce better results. In this example, if $0 \leq C(2) \leq 0.646$, then the voice band data signal has a baud rate of 2400/sec which relates to a 9600 or higher bit/sec voice band data signal; if $0.646 < C(2) \leq 0.785$, the voice band data signal has a baud rate of 1600/sec which relates to a 4800 bit/sec voice band data signal, if $0.785 < C(2) \leq 0.878$, then the voice band data signal has a baud rate of 1200/sec which relates to a 2400 bit/sec voice band data signal; and if $0.878 < C(2) \leq 1$, then the voice band data signals has a baud rate of $\leq 600$/sec which relates to voice band data signals having bit rates less than 1200 bit/sec. The results from threshold detectors unit 24 are supplied to utilization means 32 for use as desired. For example, the results are advantageously used to adjust the number of bits used in an ADPCM coder for improving the quality and efficiency of transmitting voice band data signals.

Normalized real part unit 23 generates $R_d(k) = -\text{Real}[R(k)]/R(O)$ which is related to the phase of the complex autocorrelation of $\gamma(n)$. The real part of the complex autocorrelation $R(k)$ is normalized by the autocorrelation value at $k=0$ to compensate for level changes in $d(n)$. Again, the best overall results are obtained at a delay lag $k=2$. Thus, if $R_d(2) > 0$ the complex autocorrelation has a first phase, for example, a phase in the second and third quadrants and if $R_d(2) \leq 0$ the autocorrelation has a second phase, for example, a phase in the first and fourth quadrants. It has been determined that if $R_d(2) \leq 0$ that $d(n)$ is a voice band data signal and if $R_d(2) > 0$ the signal is a speech signal. The $R_d(2)$ signal is supplied to an input of two dimensional threshold detector 25. Threshold detector 25 is jointly responsive to $R_d(k)$ and signal $\eta$ from ratio $-1$ unit 29 to yield a final determination of whether $d(n)$ is a speech or voice band data signal. As is explained hereinafter $\eta = m_2/m_1^2 - 1$ where $m_1$ is the first order absolute moment of the low pass version $\gamma(n)$ of $d(n)$, namely, $$m_1 \triangleq \frac{1}{N} \sum_{n=1}^{N} |\gamma(n)|$$

or $m_1 = m_1 + |\gamma(n)|/N$ and $m_2$ is the second order absolute moment of the low pass version $\gamma(n)$ of $d(n)$, namely, $$m_2 \triangleq \frac{1}{N} \sum_{n=1}^{N} |\gamma(n)|^2$$

or $m_2 = m_2 + |\gamma(n)|^2/N$. In this example, N is 256 for speech detection and 1024 for voice band data detection. Threshold detector 25, in this example, yields a signal representative that $d(n)$ is a speech signal when $R_d(2) > 0$ or $\eta > 0.3$, otherwise it yields a signal representative that $d(n)$ is a voice band data signal. Such a threshold detector would include two separate detectors having their outputs ORed. The output from threshold detector 25 is supplied to utilization means 32 for use as desired. Although both the so-called phase $R_d(2)$ and the normalized variance $\eta$ are used to distinguish between speech and voice band data, it will be apparent that either one may be used individually to make such a determination.

It has also been determined that it is desirable and important to detect the type of modulation scheme used in the voice band data signal in order to accurately distinguish between certain of the voice band data signals. For example, use of the complex autocorrelation related parameter $C(k)$ described above does not accurately distinguish a 1200 FSK signal from a 2400 bit/sec or 4800 bit/sec signal. It has been determined that a predetermined relationship between a first order absolute moment and a second order absolute moment of the complex low pass version $\gamma(n)$ of $d(n)$ adequately distinguishes as to whether the modulation type is FSK, PSK, and QAM. By definition, the moment of order P of a signal $x(n)$ is the average of $x^P(n)$ and the absolute moment of order P of a signal $x(n)$ is the average of $|x(n)|^P$.

To this end, magnitude unit 19 generates $|\gamma(n)| = \sqrt{u^2(n) + v^2(n)}$. Then the first order moment of $|\gamma(n)|$ can be evaluated as $m_1 = m_1 + |\gamma(n)|/N$; and the second order moment of $|\gamma(n)|$ can be evaluated as $m_2 = m_2 + |\gamma(n)|^2/N$. Again, in this example, for detecting speech $N = 256$ and for detecting voice band data $N = 1024$. Thus, the first order moment $m_1$ of $|\gamma(n)|$ is generated by averaging filter 26 which yields $m_1 = m_1 + |\gamma(n)|/N$. Then, squarer unit 28 yields $m_1^2$ which, in turn, is supplied to ratio $-1$ unit 29. Similarly, the second order moment $m_2$ of $|\gamma(n)|$ is generated by supplying $|\gamma(n)|$ to squarer unit 27 to yield $|\gamma(n)|^2$ and then averaging filter 30 yields $m_2 = m_2 + |\gamma(n)|^2/N$. Then, $m_2$ is supplied to ratio $-1$ unit 29 which, in turn, yields a so-called normalized variance $\eta$ of $|\gamma(n)|$, namely, $\eta = m_2/m_1^2 - 1$.

As indicated above the normalized variance $\eta$ is supplied to two dimensional threshold detector 25 for use in distinguishing between speech and voice band data signals. The normalized variance $\eta$ is also supplied to threshold detectors 31 for distinguishing between several types of voice band data modulation. In this example, the modulation types being distinguished are frequency shift keying (FSK), pulse shift keying (PSK)

and quadrature amplitude modulation (QAM). In this example, it has been determined that if $0 < \eta \leq 0.021$, then the modulation type is FSK; if $0.021 < \eta \leq 0.122$ then the modulation type is PSK; and if $0.122 < \eta$ then the modulation type is QAM. The results from threshold detectors 31 are supplied to utilization means 32 where they are used for determining the particular voice band data signal being received.

Thus, it is seen that use of $\eta$ allows to discriminate between FSK, PSK and QAM voice band data signals, while C(2) can be used to discriminate among 2400 baud/sec, 1600 baud/sec, 1200 baud/sec and 600 baud/sec or lower baud signals. These latter signals are related to 9600 bit/sec, 4800 bit/sec, 2400 bit/sec and 1200 bit/sec or lower bit rate signals. If desired C(k) at delay k=3, i.e., C(3), can be generated as described above for C(2) and used to discriminate between 1200 bit/sec and 300 bit/sec voice band data signals.

In situations where it is desired only to discriminate 9600 bit/sec voice band data signals from all others and can tolerate assigning to the 4800 QAM voice band data signal a higher speed classification, then use of the normalized variance $\eta$ for $N \geq 512$ is sufficient.

Figure 2:
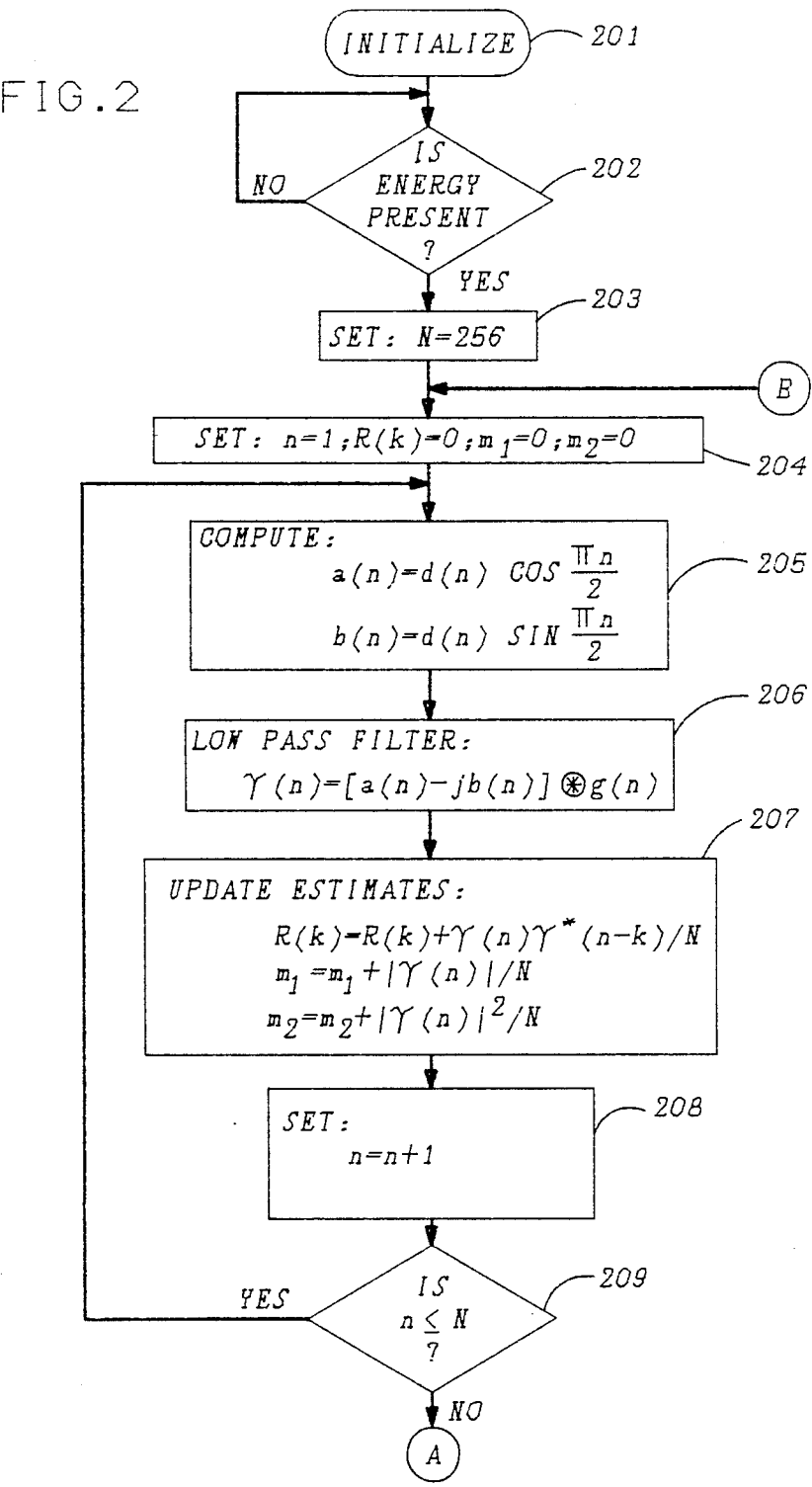
FIGS. 2 and 3 when combined A—A and B—B form a flow chart illustrating operation of a classification arrangement in accordance with aspects of the invention.
Figure 3:
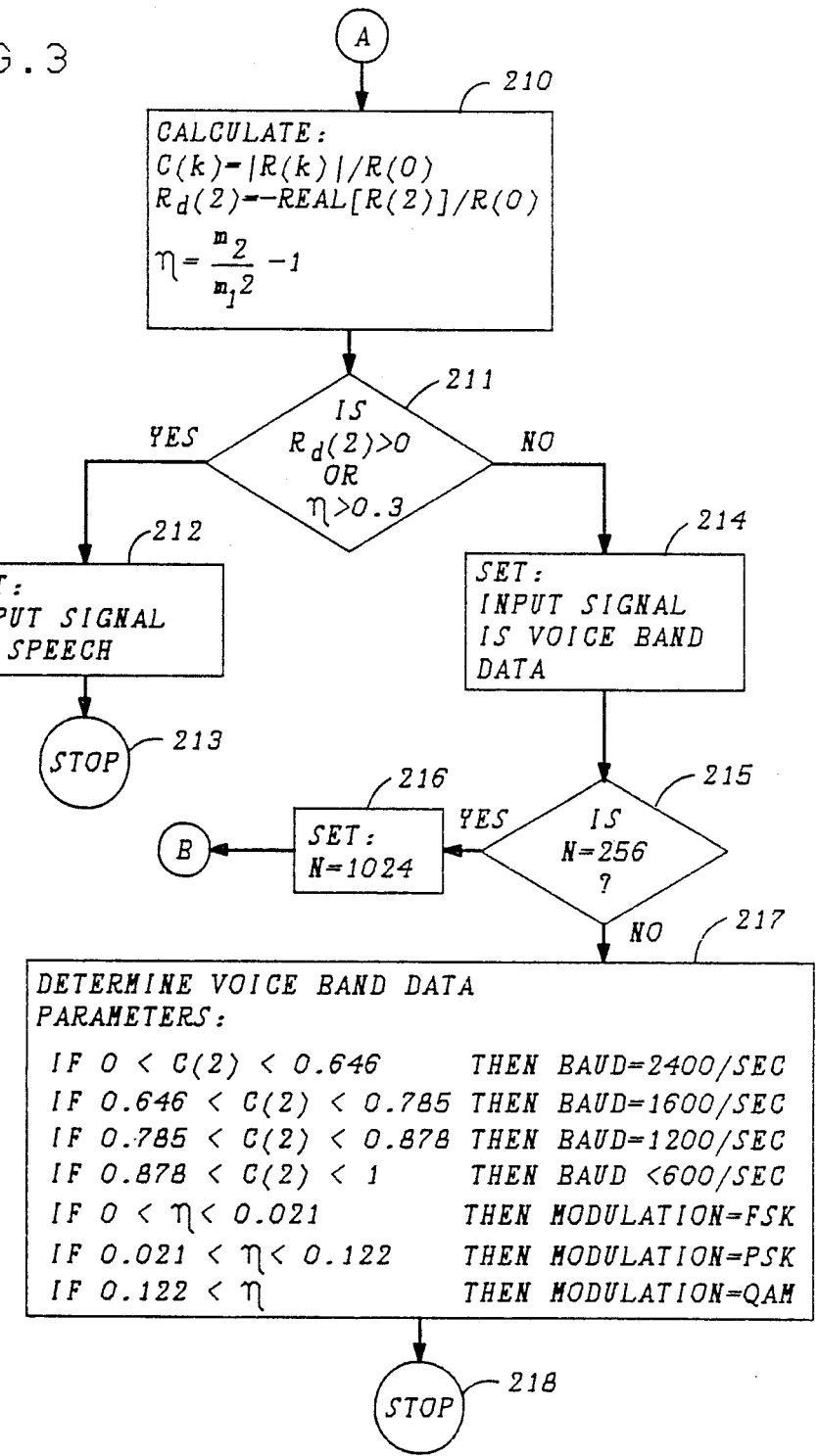

Preferably, the above described classification arrangements are to be implemented on a very large scale integrated (VLSI) circuit. However, the classification arrangements are also readily implemented via use of a processor, for example, an array processor. To this end, FIGS. 2 and 3 when combined A—A and B—B form a flow chart illustrating the steps for implementing the classification of incoming digital signals, in accordance with aspects of the invention. Accordingly, the program routine is entered via initialized step 201. Conditional branch point 202 tests to determine if input energy is present. If the test result is YES, energy is present and operational block 203 causes and N to be set to N=256. As noted above N=256 is the number of samples used to detect whether the incoming signal d(n) is speech or voice band data. Operational block 204 causes n, R(k), $m_1$ and $m_2$ to be set to n=1, R(k)=0, $m_1$=0 and $m_2$=0. Operational block 205 causes the computation of $a(n) = d(n) \cos(\pi n/2)$. and $b(n) = d(n) \sin(\pi n/2)$. Operational block 206 causes generation of the complex low pass version $\gamma(n)$ of incoming signal d(n) by low pass filtering by the filter function g(n) the results of step 205, namely $\gamma(\eta) = [a(\eta) - jb(\eta)] * g(\eta)$, where * indicates the convolution function. As indicated above, in this example, a low pass filter function g(n) is employed that is a second order recursive filter with a cutoff frequency at 2 kHz. Operational block 207 causes estimates of R(k), $m_1$ and $m_2$ to be updated. As indicated above, R(k) is the autocorrelation of incoming complex digital signal $\gamma(n)$ and the updated value is $R(k) = R(k) + \gamma(n)\gamma^*(n-k)/N$ where * indicates the complex conjugate. In this example, a delay, i.e., lag of k=2 sample intervals is used. Again $m_1$ is the first order moment of $|\gamma(n)|$ and its updated value is $m_1 = m_1 + |\gamma(n)|/N$ and $m_2$ is the second order moment of $|\gamma(n)|$ and its updated value is $m_2 = m_2 + |\gamma(n)|^2/N$. Operational block 208 causes the setting of n=n+1. Conditional branch point 209 tests whether $n \leq N$. If the test result is YES control is returned to operational block 205 and steps 205-209 are iterated until the test result in step 209 is NO. This indicates that the 256 samples window has occurred over which the values of R(k), $m_1$ and $m_2$ are being estimated. Then, operational block 210 causes the following calculations to be performed: the normalized magnitude C(k) of the complex autocorrelation of $\gamma(n)$, namely $C(k) = |R(k)|/R(0)$ where R(0) is the complex autocorrelation of $\gamma(n)$ at delay k=0; the normalized real part $R_d(2)$ of the complex autocorrelation at delay k=2, namely, $R_d(2) = -\text{Real}[R(2)]/R(0)$; and the normalized variance $\eta$ of the magnitude of the complex low pass version $\gamma(n)$ of incoming signal d(n), namely, $\eta = m_2/m_1^2 - 1$, where $m_1$ is the first order moment of $|\gamma(n)|$ and $m_2$ is the second order moment of $|\gamma(n)|$ from step 207. Conditional branch point 211 tests to determine if the incoming signal is speech or voice band data by determining, in this example, if $R_d(2) > 0$ or $\eta > 0.3$. If the test result in step 211 is YES, operational block 212 sets an indicator that the incoming signal is speech. Thereafter, the process is stopped via 213. If the test result in step 211 is NO, operational block 214 sets an indicator that the incoming signal is voice band data. Conditional branch point 215 tests to determine if N=256. If the test result is YES, operational block 216 sets N=1024 and n=1, and control is returned to operational block 204. As indicated above, in this example a window of 1024 samples is used to generate the estimates of R(k), $m_1$ and $m_2$ for voice band data signals. Thereafter, steps 204 through 211, 214 and 215 are iterated. Since N=1024 the test result in step 215 is NO. Thereafter, operational block 217 determines the voice band data signal parameters in this example, as follows: if $0 \leq C(2) \leq 0.646$ then the incoming signal baud rate is 2400/sec; if $0.646 < C(2) \leq 0.785$ then the incoming signal baud rate is 1600/sec; if $0.785 < C(2) \leq 0.878$ then the incoming signal baud rate is 1200/sec; if $0.878 < C(2) \leq 1$ then the incoming signal baud rate is equal to or less than 600/sec; if $0 < \eta \leq 0.021$ then the modulation type for the incoming signal is FSK; if $0.021 < \eta \leq 0.122$ then the modulation type for the incoming signal is PSK; and if $0.122 < \eta$ then the modulation type for the incoming signal is QAM. Thereafter, the process is stopped via 218.

What is claimed is:

1. Apparatus for classifying a signal comprising,
    means for generating a complex low-pass version of an incoming signal,
    means for generating an autocorrelation of said complex low-pass version of said incoming signal, and
    means for utilizing said autocorrelation to classify said incoming signal as one of a plurality of classifications.

2. The apparatus as defined in claim 1 wherein said means for generating generates said autocorrelation at a prescribed delay interval.

3. The apparatus as defined in claim 2 wherein said incoming signal is a digital signal sample having a predetermined sample interval and wherein said prescribed delay interval is a predetermined number of said sample intervals.

4. The apparatus as defined in claim 3 wherein said predetermined number of sample intervals is two (2).

5. The apparatus as defined in claim 2 wherein said means for generating includes means for generating a first prescribed characteristic of said autocorrelation and said means for utilizing uses said first prescribed characteristic to classify said incoming signal.

6. The apparatus as defined in claim 5 wherein said first prescribed characteristic is related to the magnitude of said autocorrelation.

7. The apparatus as defined in claim 5 wherein said first prescribed characteristic is the magnitude of said autocorrelation and wherein said means for generating said first characteristic includes means for normalizing said first characteristic by a second characteristic of said autocorrelation.

8. The apparatus as defined in claim 7 wherein said means for normalizing generates said second characteristic which is respresentative of the power of said incoming signal.

9. The apparatus as defined in claim 8 wherein said second characteristic is representative of said autocorrelation at zero (0) delay.

10. The apparatus as defined in claim 9 wherein said means for utilizing includes means for comparing said normalized magnitude of said autocorrelation with predetermined threshold levels to classify said incoming signal as one of a plurality of baud rates.

11. The apparatus as defined in claim 10 wherein said incoming signal is a digital signal sample having a predetermined sample interval and wherein said prescribed delay interval is a predetermined number of said sample intervals.

12. The apparatus as defined in claim 11 wherein said predetermined number is two (2).

13. A method of classifying a signal comprising the steps of, generating a complex low-pass version of an incoming signal, generating an autocorrelation of said complex low-pass version of said incoming signal, and utilizing said autocorrelation to classify said incoming signal as one of a plurality of classifications.

14. The method as defined in claim 11 wherein the step of generating the autocorrelation generates a first prescribed characteristic representative of the normalized magnitude of the autocorrelation.

15. The method as defined in claim 12 wherein the step of utilizing compares the normalized magnitude of the autocorrelation with predetermined threshold levels to classify the incoming signal as one of a plurality of baud rates.

16. The method as defined in claim 13 wherein the first prescribed characteristic is generated by normalizing the magnitude of the autocorrelation by a value representative of the power of the incoming signal.

17. The method as defined in claim 14 wherein the incoming signal is a digital signal sample having a predetermined sample interval and the autocorrelation is generated at a prescribed delay interval equal to a predetermined number of the sample intervals.

18. The method as defined in claim 15 wherein the predetermined number of sample intervals is two (2).

* * * * *